(No Model.)
J. F. WALLENSAK.
SET SCREW.
No. 278,759.                    Patented June 5, 1883.
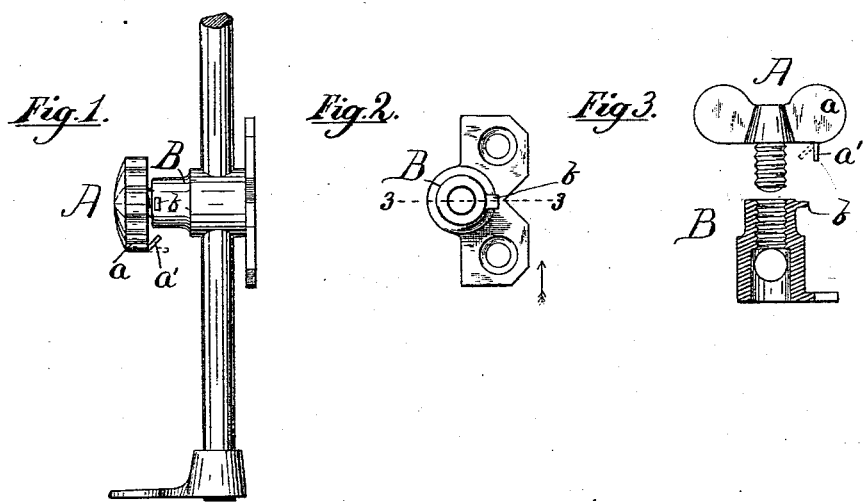
Witnesses:
J. Everett Brown
Charles C. Linthicum
Inventor:
John F. Wallensak

UNITED STATES PATENT OFFICE.

JOHN F. WALLENSAK, OF CHICAGO, ILLINOIS.

SET-SCREW.

SPECIFICATION forming part of Letters Patent No. 278,759, dated June 5, 1883.

Application filed March 8, 1883. (No model.)

*To all whom it may concern:*

Be it known that I, JOHN F. WALLENSAK, of Chicago, in the county of Cook and State of Illinois, have invented certain new and useful Improvements in Screws, of which the following is a specification.

My invention relates to that class of screws known as "set" or "thumb" screws, and its object is the providing of means to prevent that portion of the screw which is operated on by the hand from becoming detached and lost.

In the accompanying drawings, Figure 1 shows my improved set-screw with its different parts in their proper relative position, and Figs. 2 and 3 show such parts separated. Fig. 1 also shows my improved set-screw as applied to the lifting-rod of a transom-lifter.

A is the male screw, having the head $a$ and a lug, $a'$, on such head, and B is the female screw, having on its outer edge a lug, $b$.

In constructing my improved screw a lug or spur—say of malleable metal—is attached to the head of the male screw A, and after the male screw enters the female screw, this lug or spur is bent downward, so that it just clears the outer shell of the female screw B. The male screw can then be unscrewed until the lug on its head engages with the lug on the barrel of the female screw; but this engagement of the two lugs prevents further unscrewing and makes it impossible for the male screw to come out or become entirely detached.

I do not wish to be understood as limiting myself to special forms or details of construction, as it is obvious that formal changes may be made without departing from the spirit of my invention. For example, the head may be round or winged; or the lug may be omitted and a hole drilled or cast in the head and a bent pin used to engage with the lug $b$; and of course my improvement is applicable for use wherever set-screws are used.

I claim—

1. A set-screw consisting of a male and female screw provided with lugs designed to prevent their entire separation, substantially as described.

2. The male screw A, provided with a lug, $a'$, in combination with the female screw B, provided with a lug, $b$, substantially as described, and for the purpose set forth.

JOHN F. WALLENSAK.

Witnesses:
W. S. BATES,
C. C. LINTHICUM.